(12) United States Patent
Fujii

(10) Patent No.: US 6,202,177 B1
(45) Date of Patent: Mar. 13, 2001

(54) ERROR INFORMATION REPORTING SYSTEM FOR AN ERROR MONITORING SYSTEM

(75) Inventor: Katsuyuki Fujii, Tokyo (JP)

(73) Assignee: NEC Corporation, Tokyo (JP)

(*) Notice: Subject to any disclaimer, the term of this patent is extended or adjusted under 35 U.S.C. 154(b) by 0 days.

(21) Appl. No.: 08/995,164

(22) Filed: Dec. 19, 1997

(30) Foreign Application Priority Data

Dec. 20, 1996 (JP) .................................................. 8-341099

(51) Int. Cl.$^7$ .............................. H04L 12/00; H04L 3/00
(52) U.S. Cl. ................................................................. 714/40
(58) Field of Search ............................... 714/40, 44, 48, 714/57

(56) References Cited

U.S. PATENT DOCUMENTS

| | | | |
|---|---|---|---|
| 5,036,514 | * 7/1991 | Downes et al. | 371/51 |
| 5,210,869 | * 5/1993 | Williams | 395/600 |
| 5,448,722 | * 9/1995 | Lynne et al. | 395/650 |
| 5,495,573 | * 2/1996 | Datwyler et al. | 395/185.01 |
| 5,500,944 | * 3/1996 | Yoshida | 395/184.01 |
| 5,708,775 | * 1/1998 | Nakamura | 395/185.01 |
| 5,720,031 | * 2/1998 | Lindsay | 395/183.18 |
| 5,790,780 | * 8/1998 | Brichta et al. | 395/183.22 |
| 5,854,924 | * 12/1998 | Rickel et al. | 395/704 |

FOREIGN PATENT DOCUMENTS

| | | |
|---|---|---|
| 57-192163 | 11/1982 | (JP) . |
| 63-189949 | 8/1988 | (JP) . |
| 2-51925 | 2/1990 | (JP) . |
| 2-283137 | 11/1990 | (JP) . |
| 3-101539 | 4/1991 | (JP) . |
| 4-109728 | 4/1992 | (JP) . |
| 4-178743 | 6/1992 | (JP) . |
| 4-241643 | 8/1992 | (JP) . |
| 5-227316 | 9/1993 | (JP) . |
| 5-244300 | 9/1993 | (JP) . |
| 6-222956 | 8/1994 | (JP) . |
| 7-255087 | 10/1995 | (JP) . |
| 7-297826 | 11/1995 | (JP) . |
| 4321913 | 12/1995 | (JP) . |

* cited by examiner

Primary Examiner—David A. Wiley
(74) Attorney, Agent, or Firm—Foley & Lardner

(57) ABSTRACT

An error information reporting system of the present invention is applicable to an error monitoring system including a CPU (Central Processing Unit) and data output terminals. When a critical error occurs in a device being monitored, all data necessary for analysis and remedy are immediately sent to all expected destinations.

11 Claims, 4 Drawing Sheets

Fig. 3

| KEY WORD | COLLECTED DATA | | |
|---|---|---|---|
| DEVICE A | DEVICE A STATUS CONTROL TABLE | | |
| TERMINAL B | TERMINAL B INFORMATION TABLE | ALL TERMINAL INFORMATION CONTROL TABLE | |

Fig. 4

| KEY WORD | DESTINATION | TRANSMITTING MEANS |
|---|---|---|
| CIRCUIT ERROR | 03-3456-7890 | FACSIMILE |
| | abc@xyz.co.jp | ELECTRONIC MAIL |
| DEVICE ERROR | 06-789-1234 | FACSIMILE |
| | | |

ERROR INFORMATION REPORTING SYSTEM FOR AN ERROR MONITORING SYSTEM

BACKGROUND OF THE INVENTION

The present invention relates to an error monitoring system including a CPU (Central Processing Unit) and a data output terminal and, more particularly, to an error reporting system for an error monitoring system.

An error monitoring system for monitoring devices included in the system and sending error information representative of errors to the outside of the system is conventional. Today, not only a display and a printer but also a facsimile apparatus and an electronic mail using a telephone circuit are usable with the error monitoring system. However, the kinds and amounts of information which can be output are limited by the outputting capability of a display or that of a printer. Moreover, the error information include only minimum necessary information to be output to a display or a printer connected to the system. Specifically, in the event of a critical error, necessary information are too much in amount to be fully output. As a result, although the occurrence of an error may be reported, it is often impractical to remove the error only with the output information. This requires a person to obtain additional information by communicating with or traveling all the way to a station where the system is situated. In addition, because the error information are fixed, not all necessary information are output in the event of an error. This is likely to prevent all necessary information from being collected when an error occurs again.

Technologies relating to the present invention are disclosed in, e.g., Japanese Patent Laid-Open Publication Nos. 2-51925, 2-283137, 3-101539, 4-109728, 5-227316, 5-244300, 7-255087, 7-297826, and 7-321913.

SUMMARY OF THE INVENTION

It is therefore an object of the present invention to provide an error information reporting system capable of reporting, when a critical error occurs, all necessary information to all necessary destinations immediately, thereby obviating confusion in the event of data collection and enhancing rapid removal of the error.

An error information reporting system of the present invention includes an error information outputting unit. An interface controls the error information outputting unit. A desired device is monitored as to an error thereof. A CPU detects error information representative of an error occurred in the device, searches for a key word corresponding to the error information, references a collected error information table listing collected error information corresponding to the key word, selects the collected error information corresponding to the key word out of the collected error information table, and sends the collected error information to a destination corresponding to the kind of the error represented by the collected error information by using transmitting means assigned to the destination.

BRIEF DESCRIPTION OF THE DRAWINGS

The above and other objects, features and advantages of the present invention will become apparent from the following detailed description taken with the accompanying drawings in which:

FIG. 3 shows a collected error information table included in the embodiment; and FIG. 4 shows a destination and transmitting means table also included in the embodiment.

DESCRIPTION OF THE PREFERRED EMBODIMENT

Figure 1:
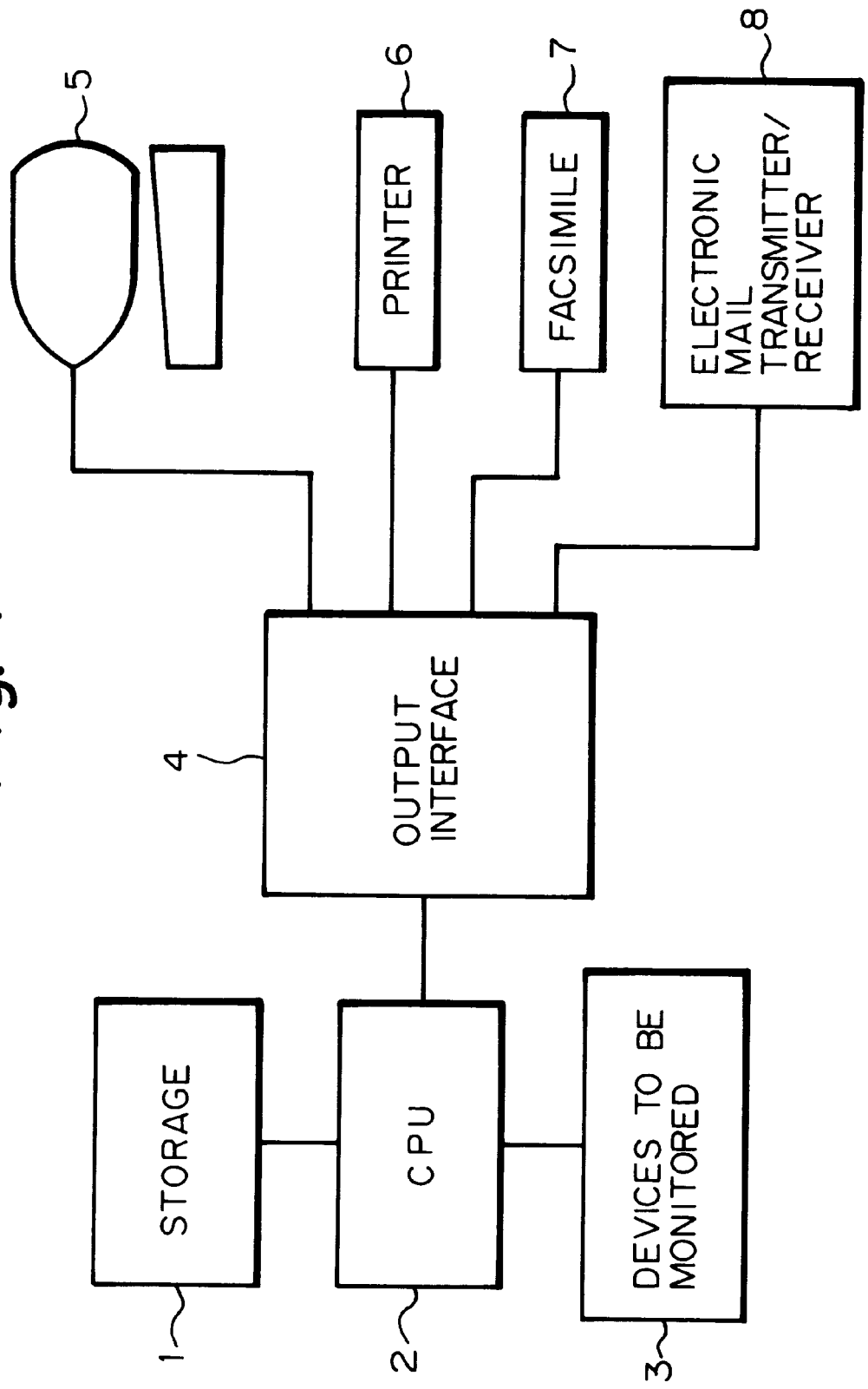
FIG. 1 is a block diagram schematically showing an error information reporting system embodying the present invention.

Referring to FIG. 1 of the drawings, an error information reporting system embodying the present invention is shown. As shown, the system includes a CPU 2 having a storage 1. Device 3 to be monitored and an output interface 4 are connected to the CPU 2. A display 5, a printer 6, a facsimile apparatus 7 and an electronic mail transmitter/receiver 8, which are data output terminals, are connected to the CPU 2 via the output interface 4 The facsimile apparatus 7 and electronic mail transmitter/receiver 8 are respectively connected to a remote facsimile apparatus and a remote electronic mail transmitter/receiver by a telephone circuit although not shown specifically.

In operation, the CPU 2 monitoring the devices 3 detects any error occurred in any one of the devices 3. The CPU 2 sends information representative of the error to the display 5 and printer 6 via the output interface 4. The information include information identifying the faulty device 3, information indicative of the degree of criticality of the error, and minimum necessary data. The CPU 2 checks, among such factors, the degree of criticality of the error. If the error is critical, the CPU 2 references a collected error information table shown in FIG. 3 and listing data to be output beforehand. The CPU 2 selects all data of the error information table designated by a coincident key word and writes them in the storage 1. Further, the CPU 2 references a destination and transmitting means table shown in FIG. 4 and also listing data to be output beforehand. Then, the CPU 2 sends the data stored in the storage 1 to a destination designated by a coincident key word by using transmission means also designated by the key word.

Figure 2:
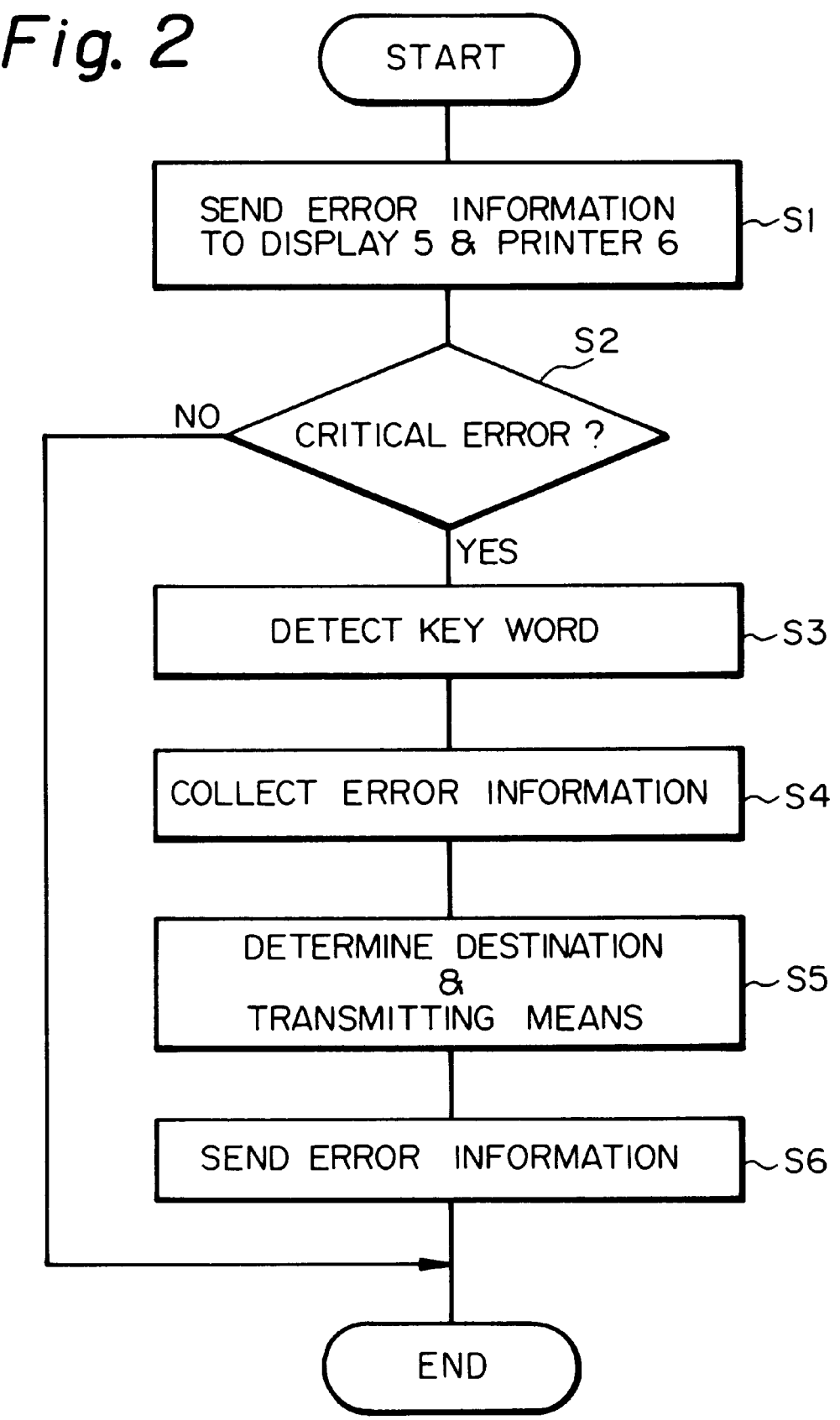
FIG. 2 is a flowchart demonstrating a specific operation of the embodiment.

A more specific operation of the error information reporting system will be described with reference to FIGS. 2, 3 and 4. As shown in FIG. 2, assume that a circuit error occurs in a device A (see FIG. 3) included in the devices 3 and is reported to the CPU 2. The CPU 2 sends the resulting error information received from the faulty device 3 to the display 5 and printer 6 (step S1). Subsequently, the CPU 2 determines, based on the error information, the degree of criticality of the above error (step S2). If the error is critical (YES, step S2), the CPU 2 searches the key words of the collected error information table shown in FIG. 3 (step S3). In this case, a key word "Device A" is coincident with the error information, so that the CPU 2 selects collected data "Device A Status Control Table" corresponding to "Device A" (step S4). Further, because an item "Circuit Error" shown in FIG. 4 is coincident with the received information, the CPU 2 selects destinations and transmitting means associated with "Circuit Error" (step S5). Finally, the CPU 2 sends the collected data to one designation "03-3456-7890" via the facsimile apparatus 7, FIG. 1, and sends them to the other destination "abc@xyz. co. jp" via the electronic mail transceiver/receiver 8, FIG. 1.

In summary, in accordance with the present invention, necessary information can be additionally registered in association with past data. This allows sufficient data relating to any kind of error to be collected and thereby enhances rapid error analysis and remedy. In addition, desired destinations can be additionally registered or deleted, so that all necessary error information can be reported to expected destinations and analyzed there.

Various modifications will become possible for those skilled in the art after receiving the teachings of the present disclosure without departing from the scope thereof.

What is claimed is:

1. An error information reporting system comprising:

error information outputting means;

an interface for controlling said error information outputting means;

a device being monitored as to an error thereof; and a CPU for (a) receiving error information representative of the error occurring in said device and sending said error information to said error information outputting means through the interface, and for (b) searching a collected error information table in which data relating to various types of errors have been collected for a key word corresponding to said error information, selecting a collected error information corresponding to said key word out of said collected error information table, and sending said collected error information to a remote destination corresponding to the type of error represented by said collected error information by using transmitting means assigned to the remote destination.

2. A system as claimed in claim 1, wherein said error information include information representative of a name of said device, and information representative of a degree of criticality of the error.

3. A system as claimed in claim 2, wherein said transmitting means comprises at least one of a facsimile apparatus and an electronic mail.

4. A system as claimed in claim 1, wherein said transmitting means comprises at least one of a facsimile apparatus and an electronic mail.

5. A system as claimed in claim 1, wherein said error information outputting means comprises a display.

6. A system as claimed in claim 1, wherein said error information outputting means comprises a printer.

7. A system as claimed in claim 2, wherein said CPU checks the degree of criticality of the error and if determined to be critical, searches the collected error information table for the key word corresponding to said error information, selects the collected error information corresponding to said key word out of said collected error information table, and sends said collected error information.

8. A method of reporting an error comprising the steps of:

monitoring a device for an error;

detecting the error and receiving error information representative of the error and outputting the error information, the error information including information representative of a name of the device and a degree of criticality of the error;

checking the degree of criticality of the error; and if the error is critical, referencing a searching collected error information table in which data relating to various types of errors have been collected for a key word corresponding to the error information, selecting a collected error information corresponding to said key word out of said collected error information table, and sending the collected error information to a remote destination corresponding to the type of error represented by the collected error information.

9. A method as claimed in claim 8, wherein the step of sending the collected error information is carried out by electronic mail.

10. A method as claimed in claim 8, wherein the step of sending the collected error information is carried out by facsimile.

11. A method as claimed in claim 8, further comprising the steps of collecting data relating to the various types of errors and preparing the collected error information table based on the collected data.

* * * * *